Nov. 5, 1929.  W. S. ELLIOTT  1,734,515
METHOD AND APPARATUS FOR DEGASIFYING LIQUIDS
Filed Nov. 19, 1923   2 Sheets-Sheet 2
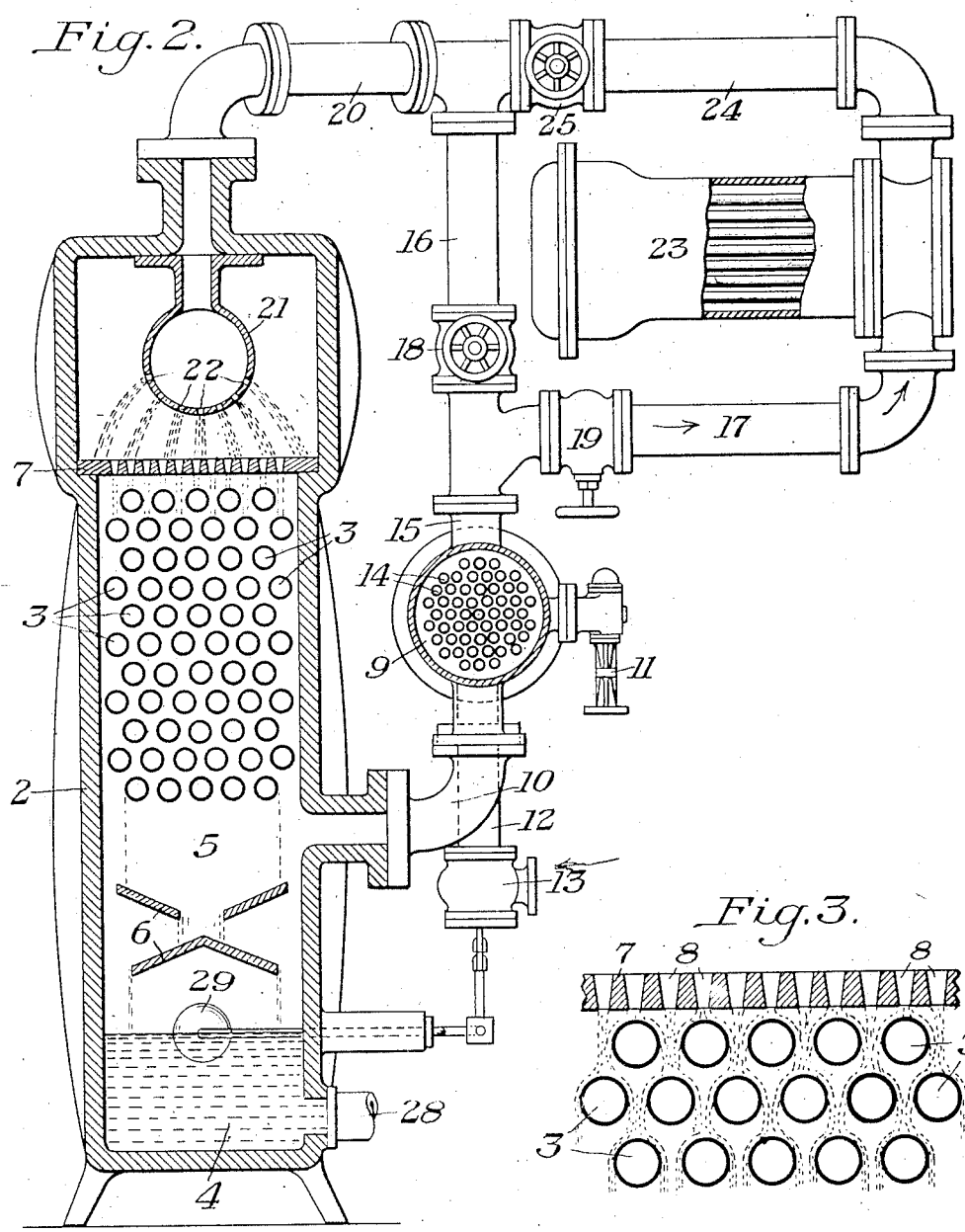
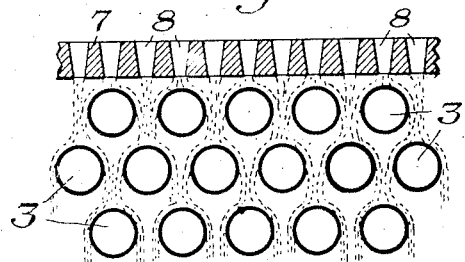
INVENTOR
William S. Elliott Patented Nov. 5, 1929

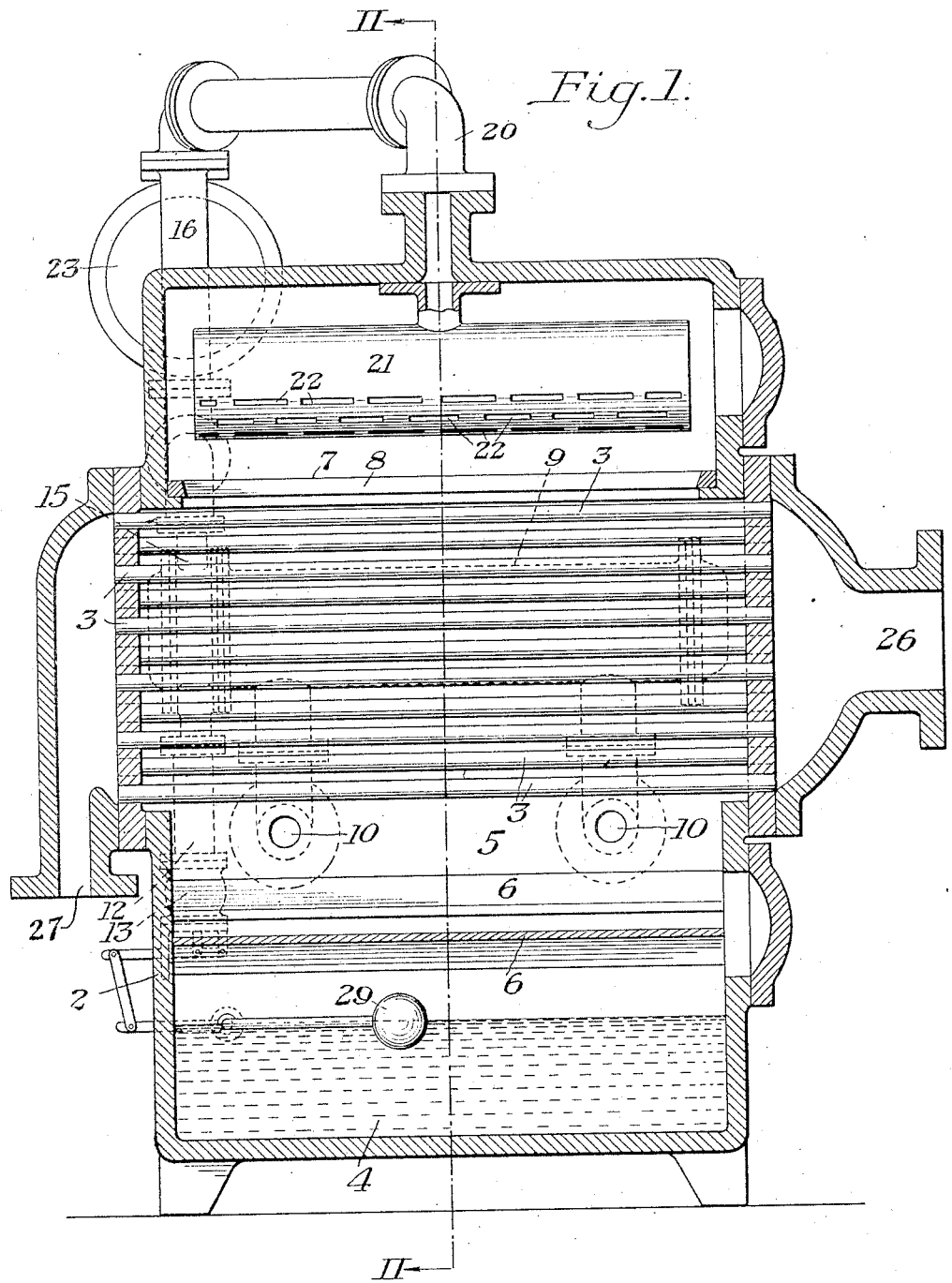

1,734,515

UNITED STATES PATENT OFFICE

WILLIAM S. ELLIOTT, OF PITTSBURGH, PENNSYLVANIA

METHOD AND APPARATUS FOR DEGASIFYING LIQUIDS

Application filed November 19, 1923. Serial No. 675,523.

The present invention relates broadly to liquid treating apparatus, and more particularly to heat exchanging apparatus for effecting removal from water of its entrained air and gases.

It has heretofore been proposed in the art to which this invention relates to attempt the removal of gases from liquids by passing the liquids in divided condition over a heating surface. The vapors released from the liquids in passing over such surface have then been drawn upwardly through the entering liquid and removed from the apparatus. While such a movement of the vapors and gases may be desirable from a standpoint of heat transfer, in that their heat is recovered by the entering liquid, it is decidedly objectionable from a standpoint of degasification. This is particularly true for the reason that the solubility of air in water is a function of the temperature, the solubility decreasing as the temperature increases. With such an apparatus, therefore, the condensable and non-condensable gases are brought into contact with the liquid under conditions which are highly effective for reentraining or redissolving the released air in the entering liquid.

In accordance with the present invention, the objections to such a method are obviated and there is provided an efficient deaerating apparatus in which not only is the heat of the released vapors and gases conserved, but the removal thereof is effected under such conditions that contamination or aeration of the liquid is not permitted.

In the accompanying drawings, I have shown, for purposes of illustration only, one embodiment of the present invention, it being understood that the drawings do not define the limits of my invention as changes in the construction and operation therein disclosed may obviously be made without departing from the spirit of my invention or scope of my broader claims.

In the drawings, which are largely diagrammatic,—

Figure 1 is a vertical sectional view through one form of apparatus constructed in accordance with the invention;

Figure 2 is a transverse sectional view on the line II—II of Figure 1; and

Figure 3 is a detail view, on an enlarged scale, of a portion of the apparatus.

In carrying out the present invention, there may be provided a separating chamber 2 having in the upper portion thereof a plurality of tubes 3 and in the lower portion a liquid space 4. Intermediate the liquid space and the tube nest is a vapor space 5 preferably containing suitable agitating means, such as baffles or plates 6.

Suitably mounted upon the tubes 3 is a distributing plate or grid 7 having provided therein a plurality of openings 8 preferably in the form of slots substantially coextensive with the length of the tubes 3. As illustrated in detail in Figure 3, these slots are preferably so arranged that they are adapted to deliver any liquid discharged onto the plate 7 directly onto the crowns of the tubes 3. In this manner the liquid is caused to spread out uniformly in comparatively thin sheets whereby it is effectively broken up to facilitate heat interchange, as hereinafter more fully described.

Located at some convenient point with respect to the chamber 2 is a condenser 9 preferably having the vapor space therein in communication with the vapor space 5 within the chamber 2 through one or more vapor connections 10. With an arrangement such as indicated in Figure 2 of the drawings, condensate formed within the condenser may be drained back into the chamber 2, while non-condensable gases, such as air, may be released therefrom by venting to the atmosphere or by positively withdrawing the same by means of a suitable ejecting device 11.

For supplying a cooling medium to the condenser 9, this medium preferably being the liquid to be degasified, there is provided an inlet connection 12 having located therein a controlling valve 13. Liquid after passing through the controlling valve enters the tubes 14 within the condenser, as understood in the art, and thereafter passes to an outlet connection 15. This outlet connection may be provided with branches 16 and 17 adapted to be controlled by valves 18 and 19, whereby the liquid upon leaving the condenser may be caused to travel through either of the branches 16 or 17 or divided and passed simultaneously through both connections. The connection 16 leads to an intake pipe 20 supplying liquid to a nozzle 21 which is preferably constructed to effect an atomization of the liquid escaping therefrom. This may be accomplished by providing the nozzle with a series of openings 22 of suitable shape.

The connection 17, on the other hand, may lead to an auxiliary heater 23 by means of which the liquid leaving the condenser 9 may be further heated before passing to the nozzle 21. The outlet from the heater 23 may lead through a pipe 24 and valve 25 to the intake pipe 20.

In operation, a supply of liquid to be degasified may be led from a suitable source through the valve 13 and condenser 9 to the nozzle 21. This liquid in escaping from the nozzle is finely broken up and in this condition falls upon the plate 7 which further breaks up and distributes the same and delivers it to the tubes 3. These tubes may be heated in any suitable manner as by steam supplied through a connection 26, condensate being removed through a drip connection 27. The liquid in passing over the tubes 3 is heated to a point to effect the evaporation of a definite percentage of the liquid at the pressure existing within the chamber 2. In United States Patent No. 1,497,491, of June 10, 1924, I have disclosed and claimed means for effecting a similar result. This result is highly desirable as I have found that the effective separation of air for uniform results is dependent on the evaporation of a definite percentage of the liquid being treated.

The vapors released by this evaporation are withdrawn through the vapor connections 10 and pass to the vapor space of the condenser 9. In this manner their heat is utilized for preheating the entering liquid. The non-condensable gases are in turn released or withdrawn from the condenser, as described.

The unevaporated liquid passes through the vapor space 5, being at this time substantially at its maximum temperature, and falls upon the agitating plates 6 by means of which it is again broken up to thereby effect the release of any remaining air. This degasified liquid then collects in the bottom of the chamber from where it may be withdrawn through an offtake connection 28.

It is highly desirable to make the supply of entering liquid proportionate to the demands for degasified liquid and to this end I preferably control the valve 13 in the liquid supply connection by the level of the liquid within the chamber 2. This may conveniently be accomplished by means of a float 29, as well understood in the art.

In some cases, where a large tube nest within the separating chamber 2 may conveniently be employed, it is unnecessary to further preheat the liquid after it leaves the condenser 9. In other cases, however, it may be desirable to materially reduce the heating surface of the tubes 3 and in that case the liquid may be passed from the condenser 9 through the preheater 23 in which it may be substantially heated to its boiling point at the pressure employed. The tubes 3 would then only impart sufficient aditional heat to insure the evaporation of an amount of the liquid sufficient to drive off all of the entrained air. In this manner, the cost of the separating chamber 2 and its associated parts can be considerably decreased.

It will be understood that both the connections 16 and 17 may be provided in a common apparatus for alternate or simultaneous use or that but one connection selected in accordance with the existing conditions, may be utilized with each installation.

By providing the vapor offtake connection or connections 10 at a point below the tubes 3, it will be apparent that the vapors are not permitted to pass upwardly into contact with the relatively cooler water discharged by the nozzle 21. They are, however, taken off at substantially the point of maximum temperature of the liquid, this being the point at which the solubility of air in the liquid is at a minimum.

The advantages of the present invention arise from the provision of an apparatus for effectively heating liquid to effect the release therefrom of the entrained air, and then withdrawing the released gases without giving them an opportunity to contaminate the supplied liquid.

I claim:

1. In apparatus for degasifying liquid, a chamber containing a heating surface and having a space below said surface, means for passing the liquid over said surface in a downward direction, and a condenser communicating with said space for condensing the vapors released within the chamber.

2. In apparatus for degasifying liquid, a chamber containing a heating surface and having a space below said surface, means for passing the liquid over said surface in a downward direction, and a condenser communicating with said space for condensing the vapors released within the chamber, said condenser having means insuring the removal of noncondensable gases therefrom.

3. In apparatus for degasifying liquid, a chamber containing a heating surface and having a space below said surface, means for passing the liquid over said surface in a downward direction, and a condenser communicating with said space for condensing the vapors released within the chamber, said condenser having an inlet connection for the liquid to be degasified whereby the liquid is preheated by said vapors.

4. In apparatus for degasifying liquid, a chamber containing a heating surface over which the liquid is adapted to flow in a downward direction, there being a space within said chamber below said surface, a condenser communicating with said space for condensing vapors released in the chamber, a heater receiving condensing liquid from said condenser and further heating the same, and a connection receiving the heated liquid from said heater and delivering the same to said chamber.

5. In apparatus for degasifying liquid, a chamber containing a heating surface over which the liquid is adapted to flow in a downward direction, there being a space within said chamber below said surface, a condenser communicating with said space for condensing vapors released in the chamber, a heater receiving condensing liquid from said condenser and further heating the same to substantially the temperature and pressure of said chamber, and a connection receiving the heated liquid from said heater and delivering the same to said chamber.

6. The method of separating gases from liquids, comprising providing a chamber having a heating surface therein, supplying liquid to said chamber at a temperature below the temperature of the heating surface, distributing the liquid over said surface, and withdrawing the vapors and gases from the chamber at a point below that at which the liquid is distributed.

7. The method of separating gases from liquids, comprising providing a chamber having a heating surface therein, supplying liquid in broken up condition to said chamber at a temperature below the temperature of the heating surface, distributing said liquor over the heating surface, and withdrawing the vapors and gases from the chamber at a point below that at which the liquid is distributed.

8. The method of separating gases from liquids, comprising providing a chamber having a heating surface therein, supplying liquid in broken up condition to said heating surface, and withdrawing vapors and gases from said chamber at substantially the point of maximum temperature therein and at a point below the heating surface.

9. The method of separating gases from liquids, comprising providing a heating chamber having a heating surface therein, supplying liquid to said chamber and delivering it in broken up condition to said heating surface, and withdrawing the vapors and gases from said chamber at a point below the heating surface.

10. In an apparatus for separating gases from liquids, a heating chamber having tubes therein, a liquid connection to supply liquid to said chamber at a temperature below the temperature of said tube, means for distributing said liquid over said tubes, and a condenser communicating with said chamber at a point below the distributing means.

11. In an apparatus for separating gases from liquids, a chamber having heating tubes therein, a liquid connection to supply liquid to said chamber, means for distributing said liquid over said tubes, and a condenser communicating with said chamber below the heating tubes therein.

12. The method of separating gases from liquids, comprising providing a chamber having a heating surface therein, supplying liquid to said chamber and delivering the liquid in broken up condition to said heating surface, and withdrawing the vapors and gases from said chamber at substantially the point of maximum temperature therein and at a point below the delivery of liquid to said chamber.

13. In an apparatus for separating gases from liquids, a chamber having tubes therein, a liquid connection to supply liquid in broken up condition to said tubes, and a gas offtake connection leading from said chamber at substantially the point of maximum temperature therein and at a point below said liquid connection, there being means cooperating with said gas offtake connection for recovering the heat therefrom.

14. The method of separating gases from liquids, comprising providing a chamber having heating means therein, delivering liquid to said chamber and to said heating means, and withdrawing the vapors and gases from said chamber at a point where the solubility of the gases in the liquid is at a minimum.

15. The method of separating gases from liquids, comprising providing a chamber having a heating surface therein over which the liquid is adapted to pass, supplying liquid to said surface in broken up condition, and withdrawing vapors and gases from said chamber at a point where the solubility of the gases in the liquid is at a minimum.

16. In apparatus for separating gases from liquids, a chamber having a heating surface therein over which the liquid is adapted to pass, a liquid connection to supply heated liquid in broken up condition to said surface, a vapor and gas offtake leading from said chamber at a point where the solubility of the gas in the liquid is at a minimum, and means cooperating with said offtake for imparting the heat of the vapor and gases to the liquid supplied to said chamber.

17. In apparatus for degasifying liquid, a chamber containing a heating surface and having a space below said surface, means for supplying a heating medium for heating said surface, means for passing the liquid to be degasified over said surface in a downward direction for abstracting heat therefrom, and a condenser communicating with said space for condensing the vapors released within said chamber.

18. In the method of treating liquid to effect the removal of air therefrom, the steps consisting of supplying liquid to a heating means to pre-heat the same, conducting the pre-heated liquid to a separating chamber, further heating the liquid in said chamber to effect the substantially constant evaporation of a definite percentage of the liquid, and maintaining the vapors and gases released by said evaporation out of contact with the preheated liquid at the temperature at which it is conducted to the separating chamber.

19. In the method of treating liquid to effect the removal of air therefrom, the steps consisting in supplying liquid to a heating means to pre-heat the same, conducting the pre-heated liquid to a separating chamber, and further heating the liquid in said chamber to effect the substantially constant evaporation of a definite percentage of the liquid, the heat of the vapor and gases released within the separating chamber being utilized for at least partially pre-heating the liquid while being maintained entirely out of contact with said liquid at the temperature at which it leaves said pre-heating means.

20. Water heating and deaerating apparatus comprising in combination a deaerating chamber having an upper water inlet from which heated water passes through the upper chamber in divided form, a closed heater comprising steam containing tubes below said upper chamber for boiling the water in contact therewith, a closed water heater external to said chamber comprising a steam space traversed by tubes and means for passing the water treated to said chamber inlet through the last mentioned tubes, whereby the water is initially heated in said external heater and subsequently further heated by the tubes of said first mentioned heater and means for withdrawing air from said chamber independently of said closed heater.

21. Water heating and deaerating apparatus comprising in combination a deaerating chamber having an upper water inlet from which heated water passes through the upper chamber in divided form, a closed heater comprising steam containing tubes below said upper chamber for boiling the water in contact therewith, and a closed water heater external to said chamber comprising a steam space traversed by tubes, means for passing the water treated to said chamber inlet through the last mentioned tubes, whereby the water is initially heated in said external heater and subsequently further heated by the tubes of said first mentioned heater, an air offtake from said apparatus, and heat recovery means cooperating with said air offtakes for heating the water during its passage to said external heater.

22. Water heating and deaerating apparatus comprising in combination a deareating chamber having an upper water inlet from which heated water passes through the upper chamber in divided form, a closed heater comprising steam containing tubes below said upper chamber for boiling the water in contact therewith, and a closed water heater external to said chamber comprising a steam space traversed by tubes, means for passing the water treated to said chamber inlet through the last mentioned tubes, whereby the water is initially heated in said external heater and subsequently further heated by the tubes of said first mentioned heater, an air offtake from said apparatus and heat recovery means cooperating with said air offtake.

23. Water heating and deaerating apparaus comprising in combination a deaerating chamber containing a steam space and having a water inlet and means for passing the water from said inlet through said steam space in divided form, a closed heater comprising steam containing tubes within said chamber for evaporating a portion of the water passing into said chamber through said inlet and thereby supplying steam to said steam space, a closed water heater external to said chamber comprising a steam space traversed by tubes, means for passing the water treated to said chamber inlet through said last mentioned tubes whereby the water is initially heated by said external heater and later by said first mentioned tubes and means for withdrawing air from said chamber independently of said closed heater.

24. In the method of treating liquid to effect the removal of air therefrom and the production of deaerated water, the steps consisting in supplying liquid to a heating means to preheat the same, conducting the preheated liquid to a separating chamber, further heating the liquid in said chamber to effect the substantially constant evaporation of a definite percentage of the liquid, and withdrawing vapors and gases away from said liquid at a point where the solubility of the gases in the liquid is at a minimum.

25. In the method of treating liquid to effect the removal of air therefrom and the production of deaerated water, the steps consisting in supplying liquid to a heating means to preheat the same, conducting the preheated liquid to a separating chamber, further heating the liquid in said chamber to effect the substantially constant evaporation of a definite percentage of the liquid, and venting the vapors and gases released within the evaporating chamber from said chamber at a point where the solubility of the gases in the liquid is at a minimum.

In testimony whereof I have hereunto set my hand.

WILLIAM S. ELLIOTT.